United States Patent
Kim

(10) Patent No.: US 6,580,473 B2
(45) Date of Patent: Jun. 17, 2003

(54) ACTIVE MATRIX DISPLAY DEVICES WITH LADDER-SHAPED ELECTRODES OR PIXEL ELECTRODE CONTACTING SIDE OF DRAIN ELECTRODE

(75) Inventor: Dong-Gyu Kim, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/829,818

(22) Filed: Apr. 10, 2001

(65) Prior Publication Data

US 2001/0019376 A1 Sep. 6, 2001

Related U.S. Application Data

(62) Division of application No. 08/884,607, filed on Jun. 30, 1997, which is a continuation-in-part of application No. 08/602,104, filed on Feb. 23, 1996, now Pat. No. 5,696,566, which is a division of application No. 08/070,717, filed on Jun. 1, 1993, now Pat. No. 5,517,341.

(30) Foreign Application Priority Data

Aug. 30, 1996 (KR) .............................................. 96-36724

(51) Int. Cl.$^7$ ............................................. G02F 1/1343
(52) U.S. Cl. ........................... 349/38; 349/39; 349/111; 349/138; 349/139
(58) Field of Search ............................. 349/38, 39, 54, 349/122, 138, 139, 111

(56) References Cited

U.S. PATENT DOCUMENTS

| | | | | |
|---|---|---|---|---|
| 4,534,622 A | * | 8/1985 | Harada et al. .............. 350/334 |
| 4,568,149 A | | 2/1986 | Sugata et al. ................ 349/111 |
| 4,636,038 A | * | 1/1987 | Kitahara et al. ......... 350/339 R |
| 4,704,002 A | * | 11/1987 | Kikuchi et al. ............. 350/334 |
| 4,938,567 A | | 7/1990 | Chartier ...................... 349/147 |
| 5,327,001 A | * | 7/1994 | Wakai et al. ............... 257/350 |
| 5,426,523 A | | 6/1995 | Shimada et al. ............... 359/54 |
| 5,585,951 A | * | 12/1996 | Noda et al. .................. 349/122 |
| 5,682,211 A | | 10/1997 | Yao et al. ...................... 349/38 |
| 5,686,977 A | | 11/1997 | Kim et al. ..................... 349/38 |
| 5,696,566 A | | 12/1997 | Kim et al. ..................... 349/38 |
| 5,706,064 A | * | 1/1998 | Fukunaga et al. ............ 349/43 |
| 5,708,485 A | | 1/1998 | Sato et al. ..................... 349/44 |
| 5,721,601 A | * | 2/1998 | Yamaji et al. ............... 349/138 |
| 5,767,926 A | | 6/1998 | Kim et al. ..................... 349/38 |
| 5,831,708 A | * | 11/1998 | Hiraishi et al. ............. 349/143 |
| 5,877,830 A | | 3/1999 | Shimada et al. ............ 349/111 |
| 6,211,928 B1 | * | 4/2001 | Oh et al. ....................... 349/43 |

FOREIGN PATENT DOCUMENTS

JP        5-297412     11/1993

\* cited by examiner

*Primary Examiner*—Toan Ton
*Assistant Examiner*—Andrew M Schechter
(74) *Attorney, Agent, or Firm*—Myers Bigel Sibley & Sajovec PA

(57) ABSTRACT

Active matrix display devices having improved opening and contrast ratios utilize light blocking lines to improve display contrast ratios yet position the light blocking lines on the same level of metallization as the gate lines to thereby limit parasitic capacitive coupling between the data lines and the pixel electrodes. The light blocking lines are also positioned on only one side of the data lines so that improvements in the display's opening ratio can also be achieved. The light blocking lines are preferably patterned so that no overlap occurs between a display's data lines and the light blocking lines. The elimination of overlap reduces the step height in the display's pixel electrodes and thereby reduces the extent of disclination of the liquid crystal molecules in the liquid crystal material extending opposite the pixel electrodes. The light blocking lines are also preferably patterned beneath the display's data lines so that parasitic capacitive coupling between the data lines and the pixel electrodes is reduced. The light blocking lines are also preferably formed with beveled edges so that the step height in the display's pixel electrodes can be reduced even further.

23 Claims, 7 Drawing Sheets

ACTIVE MATRIX DISPLAY DEVICES WITH LADDER-SHAPED ELECTRODES OR PIXEL ELECTRODE CONTACTING SIDE OF DRAIN ELECTRODE

CROSS-REFERENCE TO RELATED APPLICATIONS

This application is a division of U.S. application Ser. No. 08/884,607, filed Jun. 30, 1997, which is a continuation-in-part of U.S. application Ser. No. 08/602,104, filed Feb. 23, 1996, now U.S. Pat. No. 5,696,566, which is a division of U.S. application Ser. No. 08/070,717, filed Jun. 1, 1993, now U.S. Pat. No. 5,517,341.

FIELD OF THE INVENTION

The present invention relates to display devices and methods of forming display devices, and more particularly to liquid crystal display devices and methods of forming liquid crystal display devices.

BACKGROUND OF THE INVENTION

In order to minimize the space required by display devices, research into the development of various flat panel display devices such as LCD display devices, plasma display panels (PDP) and electro-luminescence displays (EL), has been undertaken to displace larger cathode-ray tube displays (CRT) as the most commonly used display devices. Particularly, in the case of LCD display devices, liquid crystal technology has been explored because the optical characteristics of liquid crystal material can be controlled in response to changes in electric fields applied thereto. As will be understood by those skilled in the art, a thin film transistor liquid crystal display (TFT LCD) typically uses a thin film transistor as a switching device and the electrical-optical effect of liquid crystal molecules to display data visually.

At present, the dominant methods for fabricating liquid crystal display devices and panels are typically methods based on amorphous silicon (a-Si) thin film transistor technologies. Using these technologies, high quality image displays of substantial size can be fabricated using low temperature processes. As will be understood by those skilled in the art, conventional LCD devices typically include a transparent (e.g., glass) substrate with an array of thin film transistors thereon, pixel electrodes, orthogonal gate and data lines, a color filter substrate and liquid crystal material between the transparent substrate and color filter substrate. The use of a-Si TFT technology typically also requires the use of separate peripheral integrated circuitry to drive the gates and sources (i.e., data inputs) of the TFTs in the array. In particular, gate driving signals from a gate driving integrated circuit are typically transmitted to the gate electrodes of TFTs in respective rows and data driving signals from a data driving integrated circuit are typically transmitted to the source electrodes of TFTs in respective columns. A display is typically composed of a TFT substrate in which a plurality of liquid crystal pixels are formed. Each pixel typically has at least one TFT and a pixel electrode coupled to the drain of the respective TFT. Accordingly, the application of a gate driving signal to the gate of a TFT will electrically connect the pixel electrode of a respective TFT to the data line connected thereto.

Referring now to FIGS. 1–3, an active matrix substrate of a conventional TFT LCD with a light blocking film will be described. This and other TFT LCDs are more fully described in U.S. Pat. No. 5,426,523 to Shimada et al. In particular, FIG. 1 is a plan view showing a conventional active matrix display device. FIG. 2 is a cross-sectional view of the active matrix display device of FIG. 1, taken along line A–A' and FIG. 3 is a cross-sectional view of the active matrix display device of FIG. 1, taken along line B–B'. As illustrated by FIG. 1, a gate line 130 is formed in a horizontal direction, and a data line 150 crosses the gate line 130. A light blocking film 8, with a width larger than that of the data line 150, is formed on each data line 150. Each of the side excess portions over the data line 150 in the transverse direction is set to a length "d". In each region defined by the gate and data lines, a pixel electrode 7 is formed so that both sides of the pixel electrode 7 overlap the neighboring blocking films and data lines by a constant length. In each pixel region, a TFT is formed. Specifically, the region of a silicon film 110 under the branch of the gate line 130 forms a gate of the TFT, the region of the silicon film 110 connected to the data line 150 by way of a contact hole 4a forms a source of the TFT, and the region of the silicon film 110 connected to the pixel electrode 7 by way of a contact hole 4b forms a drain of the TFT. If a turn-on voltage is applied to the gate line 130, a conduction path between source and drain becomes active due to the ON state of the TFT, and, therefore a video signal from the data line 150 can be transmitted to the pixel electrode 7 via the silicon film 110.

Referring now to FIG. 2, a silicon film 110 is formed on a transparent substrate 100, and serves as a source electrode, a drain electrode and a semiconductor active layer of the TFT. A gate insulating film 120 is formed on the silicon film 110 and the transparent substrate 100 so as to cover the entire surface. On a certain region of the gate insulating film 120, a gate electrode 130 is formed. Moreover, an insulating film 140 is formed on the entire surface of the gate electrode 130 and the gate insulating film 120. A contact hole 4a is formed through the gate insulating film 120 and the insulating film 140. On the insulating film 140, the data line 150 is formed and connected to the silicon film 110 via the contact hole 4a.

On the entire surface of the insulating film 140 and the data line 150, a passivation film 160 is formed, and a contact hole 4b is formed through the gate insulating film 120, the insulating film 140 and the passivation film 160. A pixel electrode 7, made of an indium-tin-oxide (ITO) film, is formed on the passivation film 160 and connected to the silicon film 110 via the contact hole 4b. A video signal received from the data line 150 passes through the silicon film 110 via the contact hole 4a, and, then, is transmitted to the ITO pixel electrode 7 via the contact hole 4b. The TFT with such a structure where the gate electrode 130 is located on the semiconductor layer is called a top gate type TFT.

A cross-sectional structure of the prior active matrix substrate coupled with a liquid crystal layer and a counter substrate will now be described with reference to FIG. 3. Here, a gate insulating film 120 is formed on a transparent substrate 100, and a data line 150 is formed thereon. A passivation film 160 is formed on the entire film of the gate insulating film 120 and the data line 150, and a light blocking film 8 is formed on the passivation film so as to cover a certain region of the passivation film over the data line 150. An insulating film 180 is formed on the entire surface of the light blocking film 8 and the passivation film 160, and an ITO pixel electrode 7 is formed thereon. In the above mentioned structure of the prior active matrix substrate, the data line 150 has a thickness of 500 nm, and is usually formed of aluminum (Al). The passivation film 160 is formed of silicon oxide (SiOx) having a thickness of 400 nm. Furthermore, the light blocking film 8 having a thickness of 100 nm is formed of the same material as the data line 150, and each of the lengths "d" of the side excess portions of the light blocking film 8 over the data line 150 in the transverse direction, is set to be 5 μm.

A counter substrate 200, including a transparent counter electrode 210 formed on the surface thereof, is attached to the active matrix substrate. Into a space between the two substrates, liquid crystal is injected to form the liquid crystal layer 190, and the thickness of the liquid crystal layer 190 is set to be about 5 μm. Here, even though abnormal light leakage occurs due to the orientation disorder of the liquid crystal molecules in the edge regions of the data line 150 (caused by a step of the data line 150), the light leakage can be blocked considerably since the light blocking film 8 is broader than the data line 150 and is formed to cover the data line 150. In these circumstances, the orientation disorder of the liquid crystal molecules by a step of the light blocking film 8 can be negligible, since the thickness of the light blocking film 8 is very small than that of the data line 150.

However, some light leakage still remains due to the considerable step of the data line 150. Especially, in a normally white mode display, the vicinity of the step of the data line 150 is not absolutely black even when a voltage is applied to the liquid crystal for a black display. Thus, the contrast of the display apparatus is degraded. In addition, the opening ratio of the liquid crystal display apparatus is made smaller since the light blocking film 8 is formed to exceed 5 μm at its side portions over the data line 150 and thus covers the pixel electrode 7 with its excess regions.

In the illustrated display device, the light blocking film 8 is located between the pixel electrode 7 and the data line 150 while overlapping one another. Accordingly, the capacitive coupling between the pixel electrode 7 and the data line 150 increases because the light blocking film 8 serves as an intermediate conductive layer. Moreover, the fabrication of this structure where the light blocking film 8 is formed on the data line 150 increases manufacturing cost since it requires additional processes such as metal deposition and etching.

Thus, notwithstanding the above described prior art active matrix liquid crystal display devices, there continues to be a need for improved liquid crystal display devices which have high contrast and opening ratios and are less susceptible to light leakage caused by disordered or misaligned liquid crystal molecules.

SUMMARY OF THE INVENTION

It is therefore an object of the present invention to provide improved liquid crystal display (LCD) devices and methods of forming same.

It is another object of the present invention to provide liquid crystal display devices having improved opening ratios and methods of forming same.

It is a further object of the present invention to provide liquid crystal display devices having improved contrast ratios and methods of forming same.

It is still a further object of the present invention to provide liquid crystal display devices having light blocking lines which do not contribute to parasitic capacitive coupling between data lines and pixel electrodes, and methods of forming same.

These and other objects, advantages and features of the present invention are provided by liquid crystal display devices which have pixel electrodes, data lines and gate lines and utilize light blocking lines to improve display contrast ratios yet position the light blocking lines on the same level of metallization as the gate lines to thereby limit parasitic capacitive coupling between the data lines and the pixel electrodes. In addition, the light blocking lines are positioned on only one side of the data lines so that improvements in the display's opening ratio can also be achieved.

In particular, according to the present invention, liquid crystal display devices comprise an array of liquid crystal display cells (e.g., TFT display cells) and a plurality of light blocking lines to improve the contrast ratios of the display devices. The light blocking lines are preferably patterned so that no overlap occurs between a display's data lines and the light blocking lines. The elimination of overlap reduces the step height in the display's pixel electrodes and thereby reduces the extent of disclination of the liquid crystal molecules in the liquid crystal material extending opposite the pixel electrodes. The light blocking lines are also preferably patterned beneath the display's data lines so that parasitic capacitive coupling between the data lines and the pixel electrodes is reduced. Moreover, although the light blocking lines are formed parallel to the data lines, they are preferably formed on only one side of the data lines so that improved opening ratios can be achieved. The light blocking lines are also preferably formed with beveled edges so that the step height in the display's pixel electrodes can be reduced even further. Thus, the light blocking lines are formed to compensate for light leakage (which may occur because of the presence of parasitic electric fields between a display's data lines and pixel electrodes during operation) yet still maintain the degree of disclination of the liquid crystal molecules at a low level by allowing the pixel electrodes to be formed with reduced step height.

According to one embodiment of the present invention, a liquid crystal display device comprises a transparent substrate having a face thereon, and first and second display cells on the substrate. The first display cell contains a first pixel electrode and has a control input (e.g., gate electrode of a TFT) electrically coupled to a first gate line. The second display cell contains a second pixel electrode and a control input electrically coupled to a second gate line. A first light blocking line is also provided on the substrate. The first light blocking line is preferably electrically coupled to the first gate line by patterning the first gate line and the first light blocking line using the same level of metallization. A first data line is also provided on the substrate. According to a preferred aspect of the present invention, the first data line overlaps the first and second pixel electrodes by not the first light blocking line. The first data line is also preferably formed at a higher level of metallization relative to the first light blocking line so that, among other things, parasitic capacitive coupling between the first data line and the first and second pixel electrodes can be maintained at a relatively low level.

According to another embodiment of the present invention, a liquid crystal display device comprises an array of liquid crystal display cells on a transparent substrate, arranged as a plurality of rows and columns of display cells. A plurality of data lines are also provided on the substrate so that each data line is disposed between adjacent columns of display cells. A plurality of ladder-shaped electrodes are also provided on the substrate and each of the ladder-shaped electrodes is disposed opposite a row of display cells so that the pixel electrodes in each row of display cells overlap a respective ladder-shaped electrode. The ladder-shaped electrodes are also preferably formed with beveled edges to improve the planar uniformity of the subsequently formed pixel electrodes and reduce the extent of disclination between the liquid crystal molecules in the liquid crystal material extending opposite the pixel electrodes.

The present invention also includes methods of forming liquid crystal display devices having improved opening and contrast ratios. In particular, according to yet another embodiment of the present invention, a method of forming a liquid crystal display device (e.g., active matrix display) includes the steps of forming a first conductive layer (e.g., aluminum) on a face of a transparent substrate and then patterning the first conductive layer to define a ladder-shaped electrode having first and second side electrodes and a plurality of rungs electrically interconnecting the first and second side electrodes. A first electrically insulating layer (e.g., $SiO_2$) is then formed on the ladder-shaped electrode. Next, a layer of amorphous silicon (a-Si) is formed on the first electrically insulating layer. The layer of amorphous silicon is then patterned to define an amorphous silicon active region extending opposite a portion of the first side electrode. A second conductive layer is then formed on the first electrically insulating layer and amorphous silicon active region. The second conductive layer is then patterned into a data line and a drain electrode so that the data line and drain electrode contact first and second portions of the amorphous silicon active region, respectively. A second electrically insulating layer (e.g., $Si_3N_4$) is then formed on the patterned second conductive layer and then patterned to expose a portion of the drain electrode. A layer of indium-tin-oxide (ITO) is then deposited and patterned to define a pixel electrode which is electrically connected to the exposed portion of the drain electrode.

Thus, the present invention provides for liquid crystal display devices having improved contrast ratios by incorporating light blocking lines therein. The light blocking lines are also patterned so that any step height in the display's pixel electrodes is maintained at a low level so that the degree of disclination in the liquid crystal material is reduced. This is achieved by patterning the light blocking lines so that they do not overlap the display's data lines. In addition, the light blocking lines are preferably positioned on only one side of the data lines so that improved opening ratios can be achieved. The parasitic loading capacitance between the data lines and pixel electrodes can also be improved by patterning the light blocking lines below the data lines, using the same level of metallization as used to form the gate lines.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
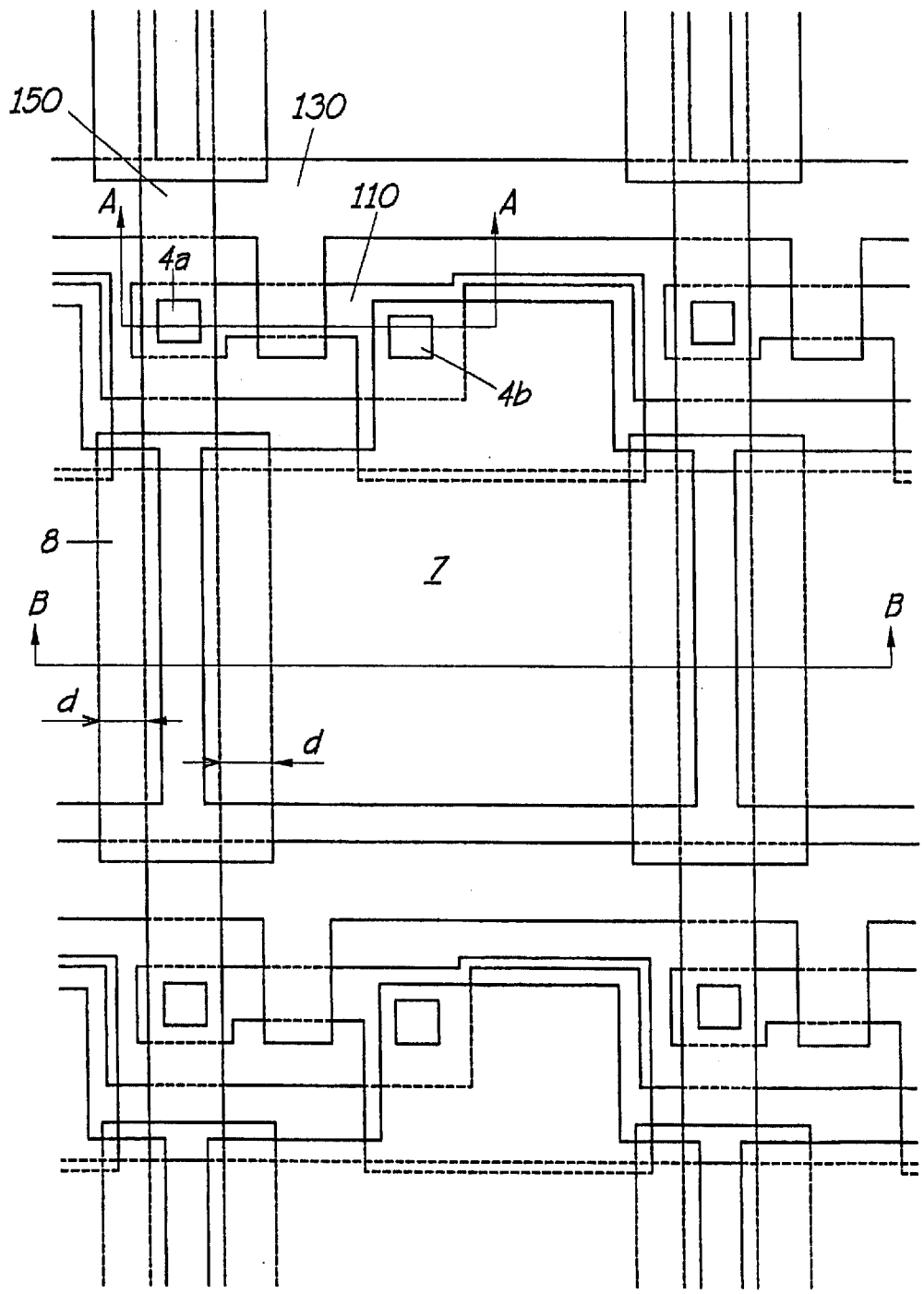
FIG. 1 is a layout schematic view of a liquid crystal display device according to the prior art.
Figure 2:
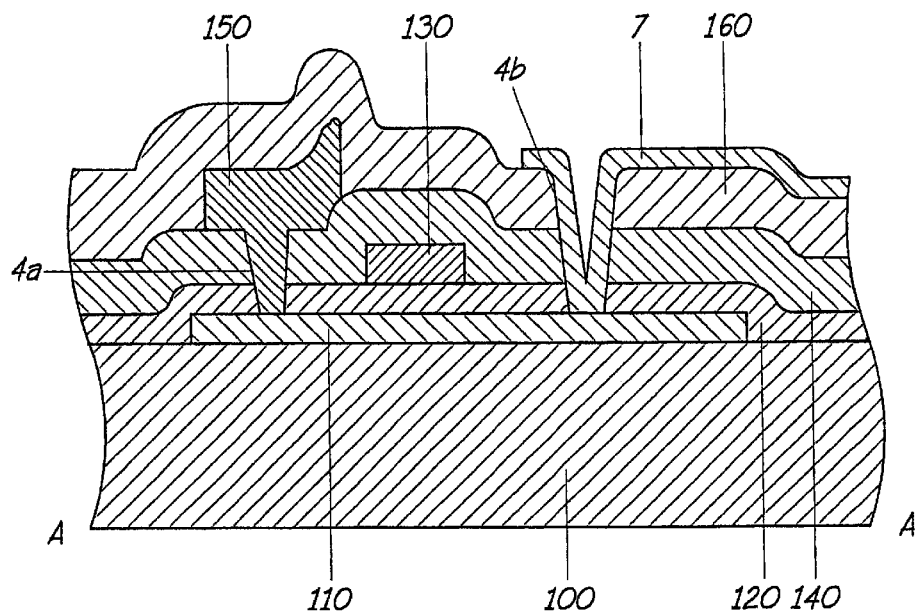
FIG. 2 is a cross-sectional view of the liquid crystal display device of FIG. 1, taken along line A–A'.
Figure 3:
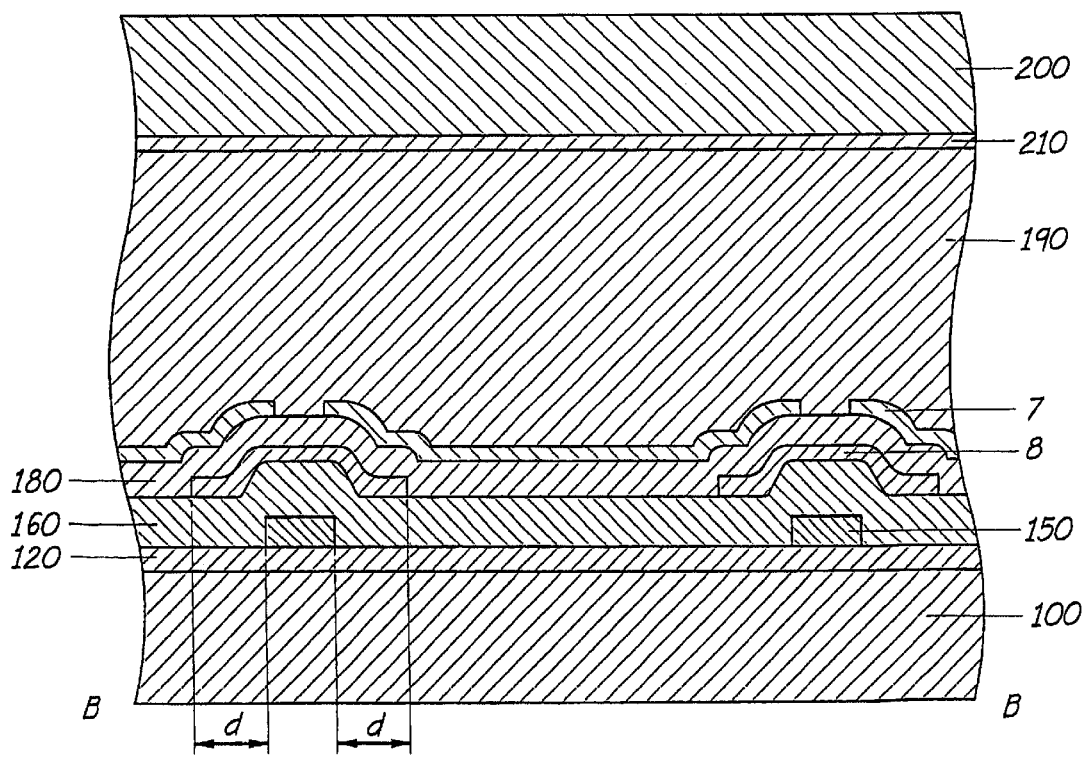
FIG. 3 is a cross-sectional view of the liquid crystal display device of FIG. 1, taken along line B–B'.
Figure 4:
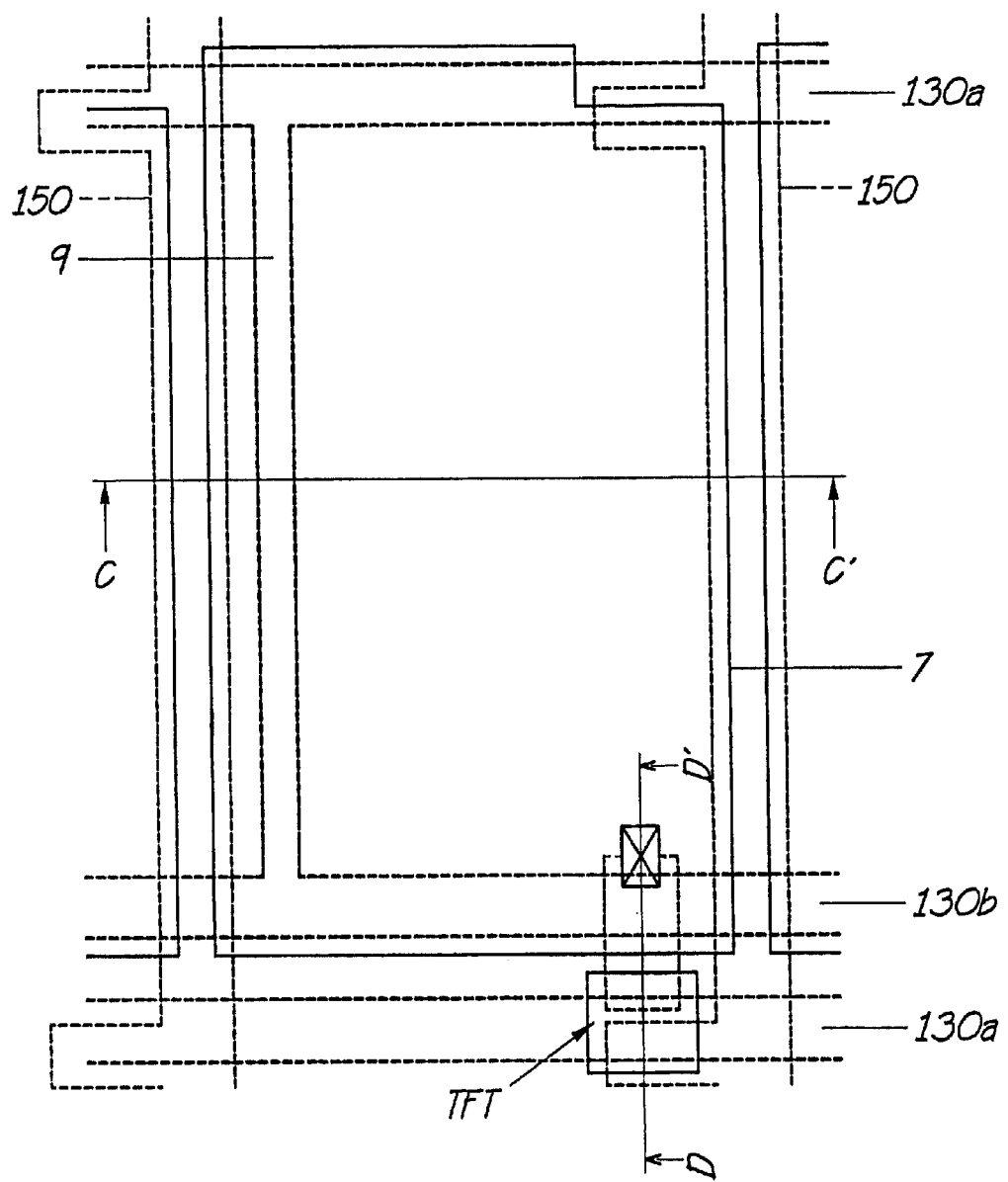
FIG. 4 is a layout schematic view of an active matrix liquid crystal display device according to the present invention.
Figure 10:
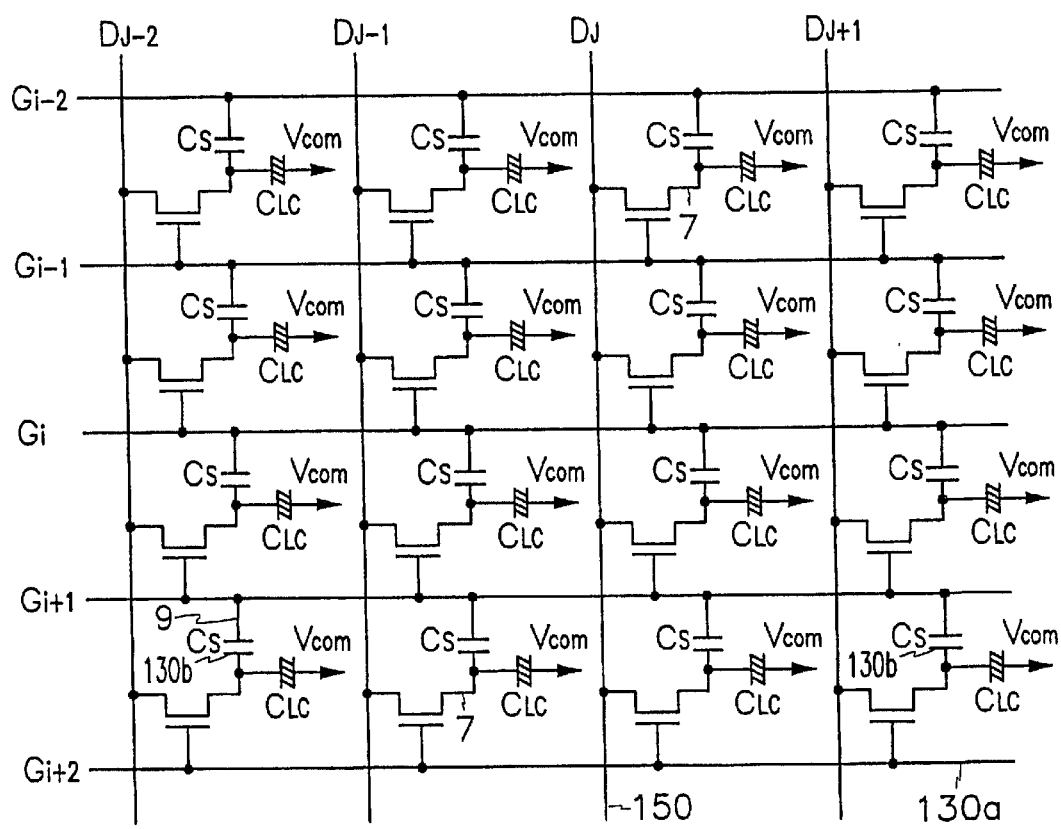
FIG. 10 is an electrical schematic of an active matrix liquid crystal display device according to an embodiment of the present invention.

Referring to FIGS. 4 and 10, layout and electrical schematic diagrams of an active matrix liquid crystal display device according to the present invention will now be described. In particular, an active matrix liquid crystal display device is provided which comprises a two-dimensional array of thin-film transistor (TFT) liquid crystal display cells arranged as a plurality of columns of display cells and a plurality of rows of display cells.

As illustrated, each column of display cells is defined between adjacent data lines 150 (e.g., $D_{j-2}, D_{j-1}, \ldots, D_{j+1}$) and each row of display cells is defined between adjacent gate lines 130a (e.g., $G_{i-2}, G_{i-1}, \ldots, G_{i+2}$). Each display cell may comprise an amorphous silicon (a-Si) thin-film field effect transistor (TFT) having a source region electrically coupled to a corresponding data line 150 via an orthogonal data line extension, a gate electrically coupled to a corresponding gate line 130a and a drain region electrically coupled to a respective pixel electrode 7 preferably formed of a transparent material such as indium-tin-oxide (ITO). Each display cell also preferably comprises a storage capacitor ($C_S$). As will be understood by those skilled in the art, the value of the storage capacitor is a function of, among other things, the area of overlap between a pixel electrode 7 and an electrode coupled to an adjacent lower order gate line. As best illustrated by FIG. 4, the value of the storage capacitor is a function of the area of overlap between each pixel electrode 7 and an underlying ladder-shaped electrode which, as described more fully hereinbelow, is comprised of a gate line 130a, a light blocking line 9 and a storage electrode line 130b. A liquid crystal capacitor $C_{LC}$ is also defined by each cell as the capacitance between a pixel electrode on a lower TFT substrate and a counter electrode 210 on an upper counter substrate 200. As illustrated, the counter electrode 210 may be biased to a common potential ($V_{com}$).

Referring again to FIG. 4, the data lines 150 are preferably patterned as a plurality of parallel lines of metallization and each row of display cells is defined opposite a respective ladder-shaped electrode which is comprised of a plurality of light blocking lines 9 at the rungs of the ladder-shaped electrode, a gate line 130a and a storage electrode line 130b which extends parallel to the gate line 130a. According to a preferred aspect of the present invention, each light blocking line 9 is defined in parallel with a corresponding data line 150, however, these lines are spaced laterally from each other so there is no overlap between them. This reduces the extent of any parasitic capacitive coupling between the data lines 150 and the light blocking lines 9. Moreover, because each light blocking line 9 is located on only one side of a respective data line 150 and pixel electrode 7, in contrast to the prior art active matrix substrates where both sides of a pixel electrode extend opposite a light blocking line, the opening ratio of the liquid crystal display device is increased. As described more fully hereinbelow, the location of each light blocking line 9 relative to a respective pixel electrode 7 is a function of the angle of orientation of the liquid crystal molecules in the liquid crystal material which separates the lower TFT substrate 100 from the upper counter substrate 200. As illustrated, the light blocking lines 9 are located on the left side of the pixel electrodes to correspond to the angle of orientation of the liquid crystal molecules 190' illustrated by FIGS. 5–7.

Figure 6:
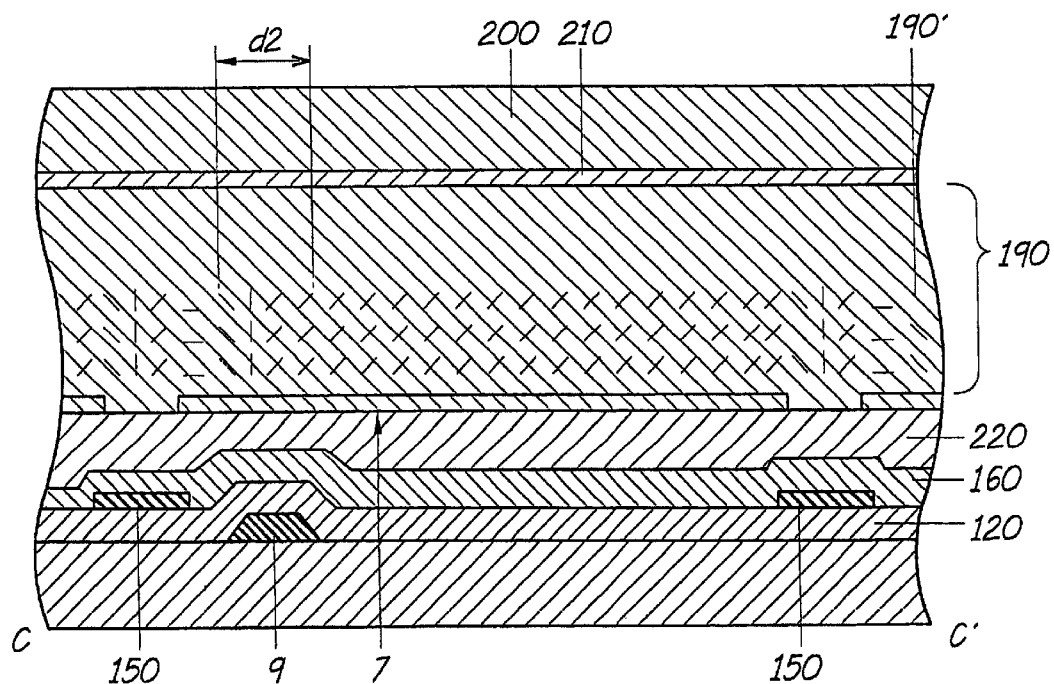
FIG. 6 is a cross-sectional view of a second embodiment of the device of FIG. 4, taken along line C–C'.
Figure 7:
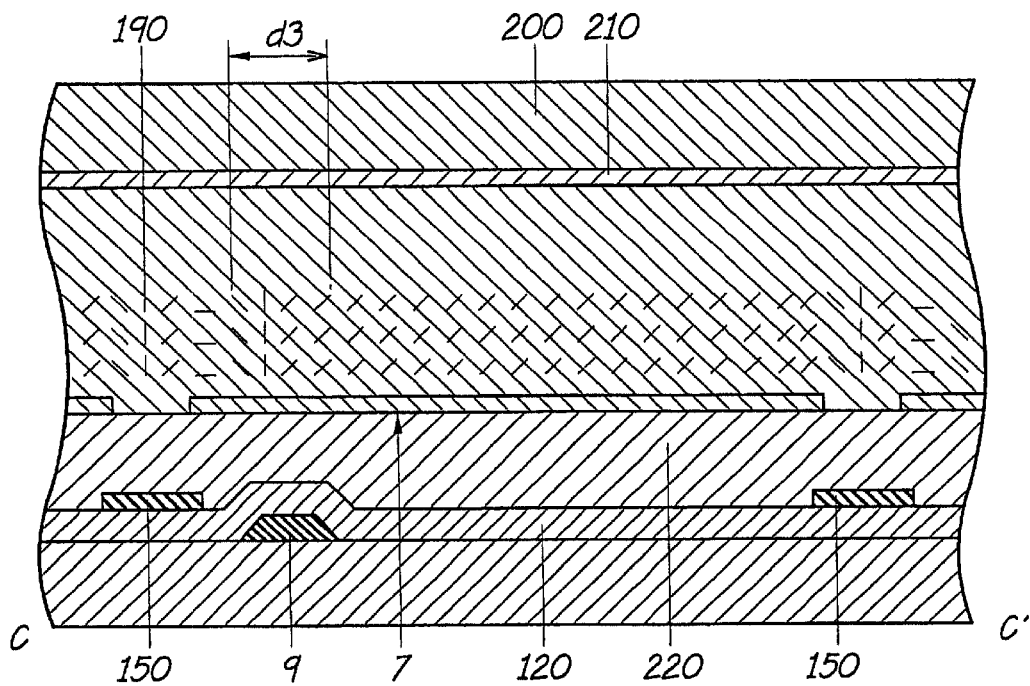
FIG. 7 is a cross-sectional view of a third embodiment of the device of FIG. 4, taken along line C–C'.
Figure 8:
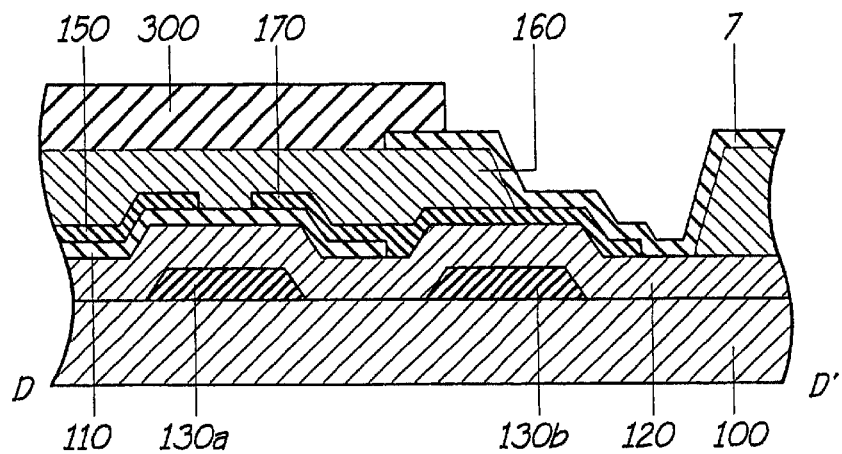
FIG. 8 is a cross-sectional view of an embodiment of the device of FIG. 4, taken along line D–D'.

Referring now to FIGS. 5–8, cross-sectional views of various embodiments of the device of FIG. 4 are illustrated. In particular, the display device of FIG. 4 may be formed by forming a first conductive layer (e.g., aluminum, titanium, tungsten and alloys thereof) on a face of a transparent substrate 100 and then patterning the first conductive layer as a ladder-shaped electrode comprised of a plurality of light blocking lines 9 (at the rungs of the ladder-shaped electrode), a gate line 130a and storage electrode line 130b. In FIG. 8, the illustrated cross-sections of the gate line 130a and the storage electrode line 130b are part of adjacent ladder-shaped electrodes. The first conductive layer may be formed to have a thickness of about 2,000 Å. After the first conductive layer has been patterned to define a plurality of ladder-shaped electrodes, the edges of the ladder-shaped electrodes are beveled, using conventional techniques, to reduce the abruptness of their cross-sectional profile to subsequently formed layers. A first electrically insulating layer 120 (e.g., $SiO_2$) is then formed on the patterned first conductive layer and face of the transparent substrate 100, as illustrated.

Next, a layer of amorphous silicon (a-Si) is formed on the first electrically insulating layer 120 and then patterned to define a plurality of amorphous silicon active regions 110 of subsequently formed TFTs. Then, a blanket second electrically conductive layer, which may have thickness of less than about 2,000 Å, is formed on the first electrically insulating layer 120 and active regions 110. The second electrically conductive layer is then patterned using conventional techniques to define (i) a plurality of parallel data lines 150 which have orthogonal extensions in ohmic contact with source region portions of the active regions 110, and (ii) a plurality of drain electrodes 170 in ohmic contact with drain region portions of the active regions 110. A second electrically insulating region 160 is then formed on the patterned second electrically conductive layer. This second electrically insulating layer 160 may comprise an inorganic passivation layer of silicon nitride ($Si_3N_4$) having a thickness of less than about 4,000 Å, for example. The second electrically insulating layer 160 is then patterned to define a plurality of openings therein which expose respective drain electrodes 170 of the display cells. An optically transparent layer of indium-tin-oxide is then formed on the second electrically insulating layer 160 and patterned to define a plurality of pixel electrodes 7. As illustrated, the opposing ends of adjacent pixel electrodes preferably overlap opposing edges of each data line 150.

Figure 5:
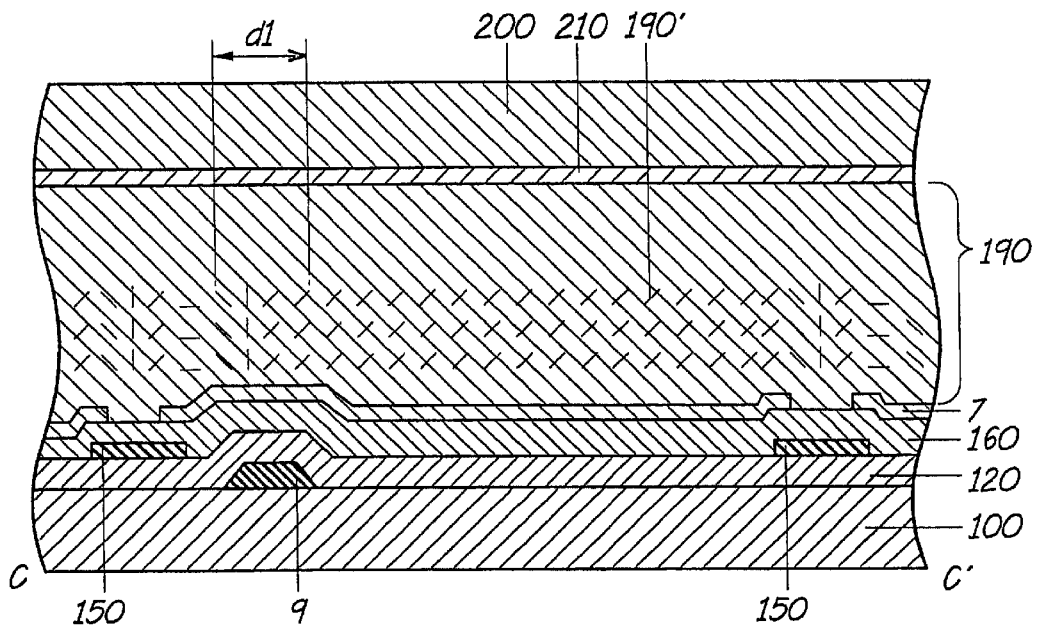
FIG. 5 is a cross-sectional view of a first embodiment of the device of FIG. 4, taken along line C–C'.

As best illustrated by FIG. 5, a upper counter substrate 200 containing a counter electrode 210 is then mounted in spaced relation opposite the lower TFT substrate 100. As will be understood by those skilled in the art, liquid crystal material is then injected into the space between the lower and upper substrates to define a liquid crystal material layer 190 having a pre-tilt angle. As will be understood by those skilled in the art, the tilt of the liquid crystal molecules 190' in the liquid crystal material layer 190 is influenced by the magnitude of the vertical electric field which can be established between each pixel electrode 7 and the counter electrode 210. However, near the vicinity of each data line 150, the tilt orientations of the liquid crystal molecules 190' in the liquid crystal material 190 are altered or scattered by stray and horizontal electric fields in the gap between adjacent pixel electrodes 7. As illustrated, the stray electric fields may be sufficient to switch the pre-tilt orientation of the liquid crystal molecules 190' to an opposite direction in what is commonly referred to as a "disclination region" illustrated as region d1. Unfortunately, the transmission of light through the disclination region is typically nonuniform and in a normally white display, light may be allowed to pass through the disclination region even when the pixel electrodes 7 are biased to provide a black display image. When this occurs, the contrast ratio of the display is adversely affected. However, according to the present invention, the light blocking lines 9 are designed to block light which otherwise would be pass through the transparent substrate 100 (from a backlight) and into the disclination region. Here, the light blocking lines 9 are typically patterned to be wider than the disclination region d1. Moreover, because the width of the disclination region d1 typically increases with any increase in step height associated with the pixel electrodes 7, the light blocking lines 9 are spaced laterally from the data lines 150 so there is no overlap therebetween which might increase the step height of the pixel electrodes 7 (and also increase the magnitude of any parasitic load capacitance between the data lines 150). Finally, because the light blocking lines 9 are positioned along only one side of the pixel electrode 7, the opening ratio of the display device may be increased.

Referring now specifically to FIG. 6, the width of the disclination region (shown as d2) may be reduced even further by improving the planar uniformity of the pixel electrodes 7. According to another preferred aspect of the present invention, this reduction in the width of the disclination region can be achieved by forming an organic electrically insulating/passivation layer 220 on the inorganic insulating layer 160. The organic insulating layer 220 preferably comprises a layer of polyimide or an acrylic resin having a smooth upper surface and a thickness in a range between about 5,000 and 7,000 Å. In particular, the organic insulating layer 220 is made sufficiently thick to offset step-height variations in the inorganic insulating layer 160. The organic insulating layer 220 may also be planarized using conventional techniques to define a planarized upper surface on which the pixel electrodes 7 can be formed.

Referring now specifically to FIG. 7, the above-described method of forming a liquid crystal display device may be simplified by omitting the step of forming an inorganic insulating layer 160 which typically involves a chemical vapor deposition step. However, to compensate for the missing inorganic insulating layer 160, an organic insulating layer 220 may be formed to have a thickness in a range between about 15,000 and 35,000 Å, however, thicker insulating layer 220 may also be used. This organic insulating layer 220 may also be planarized so that the pixel electrodes 7 have reduced step height. As will be understood by those skilled in the art, increasing the thickness of the organic insulating layer 220 increases the vertical distance between the data lines 150 and the pixel electrodes 7 and thereby reduces the magnitudes of the stray electric fields adjacent the spaces between the pixel electrodes 7. As described above, this reduction in field strength and step height reduces the width of the disclination region so that d3<d2<d1. Accordingly, the widths of the light blocking lines 9 may also be decreased as the vertical spacing between the data lines 150 and pixel electrodes 7 is increased. Thus, increased opening ratios may be achieved by increasing the thickness of the passivation layer(s) disposed between the data lines 150 and pixel electrodes 7.

Figure 9:
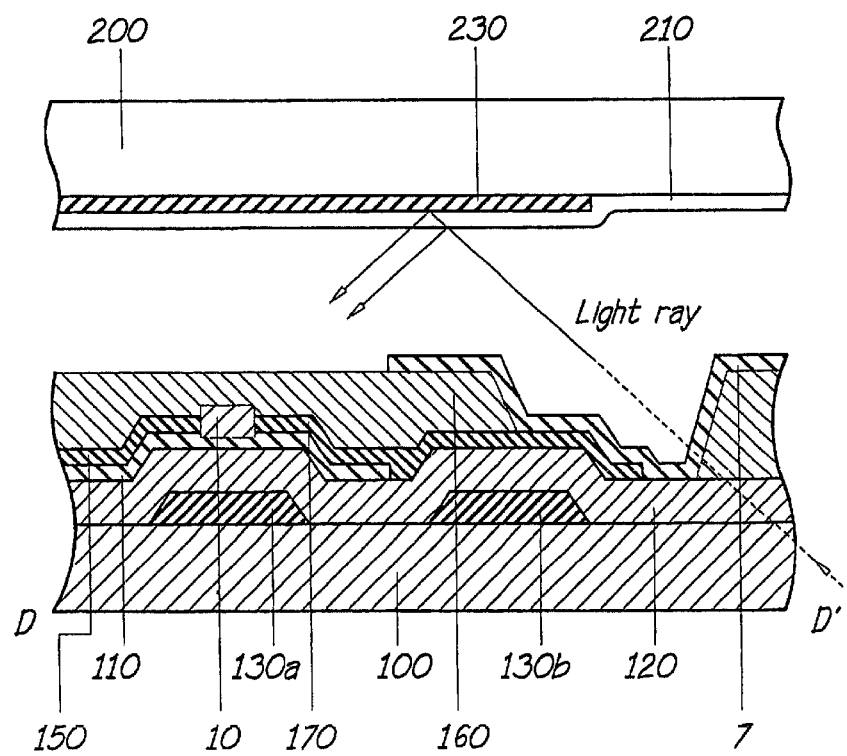
FIG. 9 is a cross-sectional view of another embodiment of the device of FIG. 4, taken along line D–D'.

FIGS. 8 and 9 also illustrated two examples for limiting light leakage in the upper and lower sides of each pixel. The two figures are cross-sectional views of the device of FIG. 4, taken along the line D–D'. The view of FIG. 8 corresponds to an etch back type amorphous silicon LCD apparatus, and the view in FIG. 9 corresponds to an etch stopper type amorphous silicon LCD apparatus. As shown in FIG. 8, an organic black matrix layer 300 is formed to cover the end portions of the gate lines 130a and storage electrode lines 130b. The organic black matrix 300 may have a thickness of about 8,000 Å or more for a higher luminous intensity. Even though the step of the black matrix 300 may raise the orientation disorder of the liquid crystal molecules 190' due to its thickness, the gate lines 130a and storage electrode lines 130b can effectively block the leakage of light which may be caused by step height of the black matrix 300 layer.

Referring now to FIG. 9, a black matrix layer 230 containing chromium is formed on the counter substrate 200. In this embodiment, the light rays reflected on the black matrix 230 may be transmitted to the channel region 10 of the TFT in the active matrix substrate, and thus light leakage can occur since the light rays produce an induced current in the channel region. However, since the amorphous silicon film layer 110 is formed very thin in the etch stopper type TFT, this light leakage can be considerably reduced.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A liquid crystal display device, comprising:
   a transparent substrate;
   an array of liquid crystal display cells containing a plurality of rows and columns of liquid crystal display cells therein, on said transparent substrate;
   a plurality of data lines on said transparent substrate, each of said data lines disposed between adjacent columns of display cells; and
   a plurality of ladder-shaped electrodes on said transparent substrate, each of said ladder-shaped electrodes disposed opposite a plurality of pixel electrodes in a respective row of display cells.

2. The display device of claim 1, wherein each ladder-shaped electrode comprises a plurality of spaced rungs which extend parallel to said plurality of data lines.

3. The display device of claim 2, wherein each of the rungs of a ladder-shaped electrode comprises a light blocking line which overlaps a respective pixel electrode in a row of display cells.

4. The display device of claim 3, wherein the data lines do not overlap the rungs of the ladder-shaped electrodes.

5. The display device of claim 1, wherein each ladder-shaped electrode is comprised of a gate line along a first side thereof which is electrically coupled to one row of display cells, a storage capacitor electrode along a second side thereof which is electrically coupled to pixel electrodes in another row of display cells and a plurality of light blocking lines which electrically connect each gate line to a respective storage capacitor electrode.

6. The display device of claim 5, wherein each ladder-shaped electrode has beveled edges.

7. The display device of claim 5, further comprising an organic passivation layer containing a material selected from the group consisting of polyimide and acrylic resins, between said plurality of data lines and the pixel electrodes in said array of liquid crystal display cells.

8. The display device of claim 7, wherein the organic passivation layer has a polished upper surface in contact with the pixel electrodes in said array of liquid crystal display cells.

9. A method of forming a liquid crystal display device, comprising the steps of:
   forming a first conductive layer on a face of a transparent substrate;
   patterning the first conductive layer to define a ladder-shaped electrode having first and second side electrodes and a plurality of rungs electrically interconnecting the first and second side electrodes;
   forming a first electrically insulating layer on the ladder-shaped electrode;
   forming a layer of amorphous silicon on the first electrically insulating layer;
   patterning the layer of amorphous silicon to define an amorphous silicon active region extending opposite the first side electrode;
   forming a second conductive layer on the first electrically insulating layer and amorphous silicon active region;
   patterning the second conductive layer into a data line and a drain electrode so that the data line and drain electrode contact first and second portions of the amorphous silicon active region, respectively;
   forming a second electrically insulating layer on the patterned second conductive layer;
   patterning the second electrically insulating layer to expose a portion of the drain electrode; and
   forming an indium-tin-oxide pixel electrode electrically connected to the exposed portion of the drain electrode.

10. The method of claim 9, wherein said step of patterning the second conductive layer comprises patterning the second conductive layer into a plurality of data lines which extend parallel to but do not overlap the plurality of rungs of the ladder-shaped electrode.

11. The method of claim 10, wherein said step of forming a pixel electrode comprises forming a pixel electrode which overlaps a respective data line and a respective rung of the ladder-shaped electrode.

12. The method of claim 11, wherein said step of patterning the first conductive layer comprises patterning the first conductive layer to define a ladder-shaped electrode having beveled edges.

13. The method of claim 12, wherein said step of patterning the second electrically insulating layer is preceded by the steps of forming an organic passivation layer on the second electrically insulating layer and then planarizing the organic passivation layer; and wherein said step of forming an indium-tin-oxide pixel electrode comprises patterning a layer of indium-tin-oxide on the planarized organic passivation layer.

14. The method of claim 12, wherein said step of forming a second electrically insulating layer comprises forming an organic passivation layer containing a material selected from the group consisting of polyimide and acrylic resins, on the patterned second conductive layer.

15. The method of claim 11, wherein said step of forming a pixel electrode comprises forming a pixel electrode which overlaps the first and second side electrodes.

16. A liquid crystal display device, comprising:
- a transparent substrate;
- a gate line on said transparent substrate;
- a gate insulating layer on said gate line;
- an amorphous silicon active region on said gate insulating layer, opposite to said gate line;
- a drain electrode contacting said amorphous silicon active region;
- an electrically insulating layer on said drain electrode, said electrically insulating layer having an opening that exposes a side surface of said drain electrode; and
- a pixel electrode directly contacting the side surface of said drain electrode exposed through the opening.

17. The liquid crystal display of claim 16, wherein said gate insulating layer or electrically insulating layer is made of silicon nitride.

18. The liquid crystal display of claim 16, wherein said drain electrode is made of a single-layered structure or double-layered structure.

19. The liquid crystal display of claim 18, wherein said drain electrode includes one selected from the group consisting of chromium, aluminum, tantalum and molybdenum.

20. The liquid crystal display of claim 16, wherein said drain electrode is made of a single-layered structure or double-layered structure.

21. The liquid crystal display of claim 20, wherein said drain electrode includes one selected from the group consisting of chromium, aluminum, tantalum and molybdenum.

22. The liquid crystal display of claim 16, wherein the gate line has a sloped lateral surface.

23. The liquid crystal display of claim 16, wherein the opening has a sloped side wall of the electrically insulating layer.

* * * * *